RE.25270

March 11, 1958 — K. C. JENNE — 2,825,943

HINGED POLE CONNECTOR

Filed Dec. 20, 1956

INVENTOR.
KENNETH C. JENNE
BY
ATTORNEY.

United States Patent Office 2,825,943
Patented Mar. 11, 1958

2,825,943

HINGED POLE CONNECTOR

Kenneth C. Jenne, Lake Worth, Fla., assignor to Malleable Iron Fittings Company, Branford, Conn., a corporation of Connecticut Application December 20, 1956, Serial No. 629,704

4 Claims. (Cl. 20—92)

The present invention relates to an improved hinged pole connector, particularly for timber structures formed of round wood poles, and has for an object to provide a connector for attachment whereby a pair of round wood poles may be secured in any desired angular relation with the axes of the poles lying within a common plane. The hinged connection according to the invention comprises a pair of hingedly connected members, and it is an object of the invention to provide a connection in which the two members are of identical form.

A further object is to provide flange means upon the connector members, so arranged that the flange means of one member of the hinge connection will interengage the flange means of the other member of the connection in such relation that the poles connected to the two members will be disposed with their axes in a common plane.

Other objects and advantages of the invention will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

Figure 1:
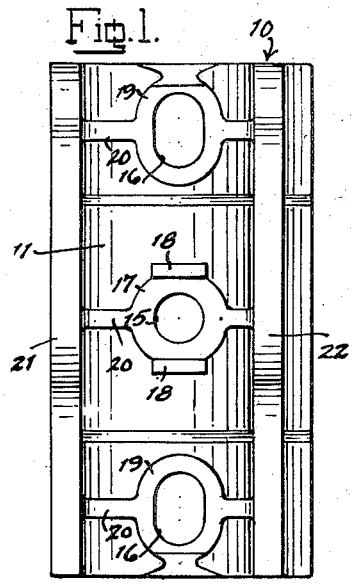
Fig. 1 is a top plan view of a hinged connector member according to the invention.
Figure 2:
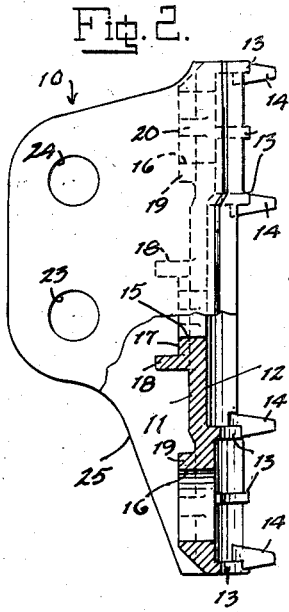
Fig. 2 is a side elevation, partially in central longitudinal section.
Figure 3:
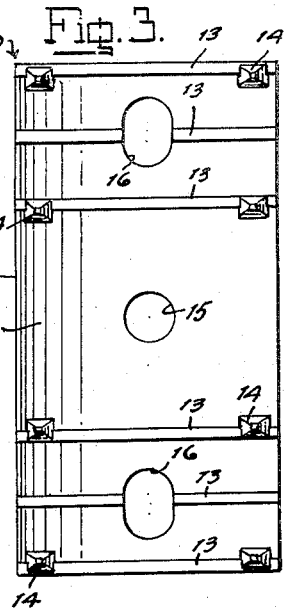
Fig. 3 is a rear elevation showing the pole engaging side of the member.
Figure 4:
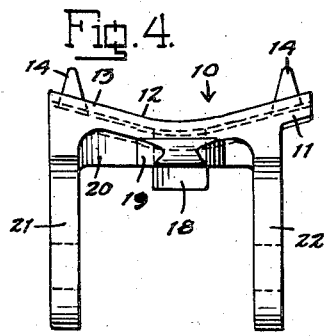
Fig. 4 is an end elevation.

Referring to the drawing, the hinged connector member, indicated generally as 10, comprises a base portion 11 concavely curved at its inner face 12 to substantially embrace the convex curved surface of a pole, being provided adjacent each end with a series of transverse ribs 13 and projecting spurs 14. Centrally of the base there is provided a bolt-receiving hole 15, and adjacent each end there is provided a slot 16 which may be either engaged by a bolt or by a lag screw for fastening the end portions of the connector to the pole.

At the forward side of the base there is provided a bearing projection 17 provided with a pair of projecting lugs 18—18 for the purpose of preventing turning of a bolt head or nut engaged with the bearing surface 17. Projecting bearing portions 19 surround the slots 16 to form bearings for the heads of bolts or lag screws engaged through the slots. Transverse reinforcing ribs 20 extend between the sides of the bearing portions 17 and 19 and a pair of flanges 21 and 22 projecting forwardly from the base 11.

Figure 5:
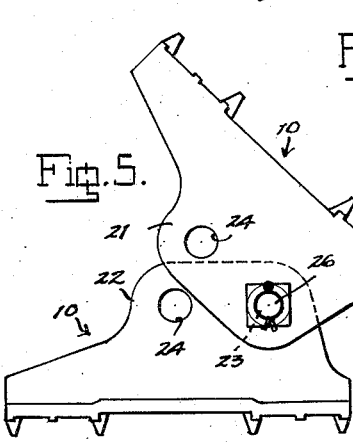
Fig. 5 is a side elevation showing the two identical members of the hinged connection connected together and disposed in angular relation.
Figure 6:
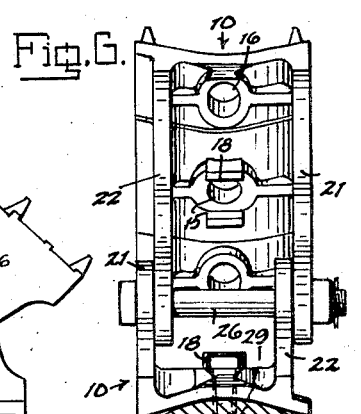
Fig. 6 is an end view of the members as seen in Fig. 5, a pole being shown connected to one of the members.
Figure 7:
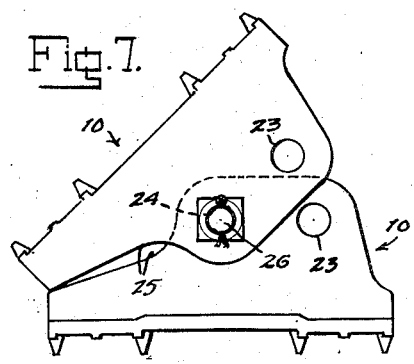
Fig. 7 is a side elevation showing an alternative method of connecting the two members of the hinged connection.

The flange 21 is provided in flush relation with one longitudinal edge of the base, while the flange 22 is inwardly offset from the other longitudinal edge a distance substantially equal to the thickness of the flange 21, so that when one connector member is interengaged with another identical connector member, as shown in Figs. 5–7, the flange 21 of one connector member will be adjacent the outer side of the flange 22 of the other connector member and its outer surface will be substantially flush with the adjacent edge of the base portion 11. The flanges are provided at suitable points with axially aligned bolt-receiving holes 23—23 and 24—24, the holes 23—23 being aligned with the centrally disposed bolt-receiving hole 15 while the holes 24—24 are disposed relatively close to one end of the connector member. The edges of the flanges are cut away, as at 25—25, between the centrally disposed holes 23 and the end of the member opposite from the end contiguous to the holes 24—24.

The two members of the hinged connector are adapted to be hingedly connected by a bolt 26, as shown in Figs. 5–7, and in certain installations it is preferred that this bolt be engaged through the holes 24 adjacent one end of the members. In other installations it is preferred that the hinged connection be substantially in line with the bolts connecting the members to the poles, and in such case the hinged bolt is engaged through the holes 23, as seen in Fig. 7. In this case the clearance provided by the cutaway portions 25 permit maximum angular hinge movement of one member relative to the other.

In Fig. 6 a pole 27 is shown secured to one of the connector members by a through bolt 28 having its head engaged upon the bearing projection 17 between the lugs 18—18. The pole is additionally secured by lag screws 29 engaged through the slots 16.

What is claimed is:

1. A hinged pole connector for hingedly connecting round wood poles, comprising a pair of identical hinge members, each of said hinge members consisting of a base portion having a forward side and a rearward side, said rearward side being concavely curved for substantially conforming engagement with the round surface of a pole, said base portion having a bolt receiving passage having its axis substantially coincident to the radius of said concavely curved rearward surface to receive a bolt extending diametrically through a pole engaged by said concavely curved rearward surface, a pair of flanges projecting from the forward side of said base portion each having a predetermined wall thickness, and one of said flanges being inwardly offset with respect to said bolt receiving passage a distance substantially corresponding to said wall thickness, and said flanges having axially aligned hinge bolt receiving holes, said hinge members being interengaged with the inwardly offset flange of each of said members in engagement at its outer side with the inner side of the non-inwardly offset flange of the other member, and a hinge bolt engaged through the bolt receiving holes of said interengaged flanges and hingedly connecting said members together.

2. A hinged pole connector according to claim 1, further characterized in that the flanges of each of said hinge members has axially aligned bolt receiving holes intersected by the axis of said bolt receiving passage.

3. A hinged pole connector according to claim 2, wherein said flanges each have additional hinge bolt receiving holes spaced from said hinged bolt receiving holes intersected by the axis of said bolt receiving passage.

4. A hinged pole connector according to claim 3, wherein said flanges have cut-away edges at one side of said hinge bolt receiving holes.

No references cited.